Patented Apr. 2, 1929.

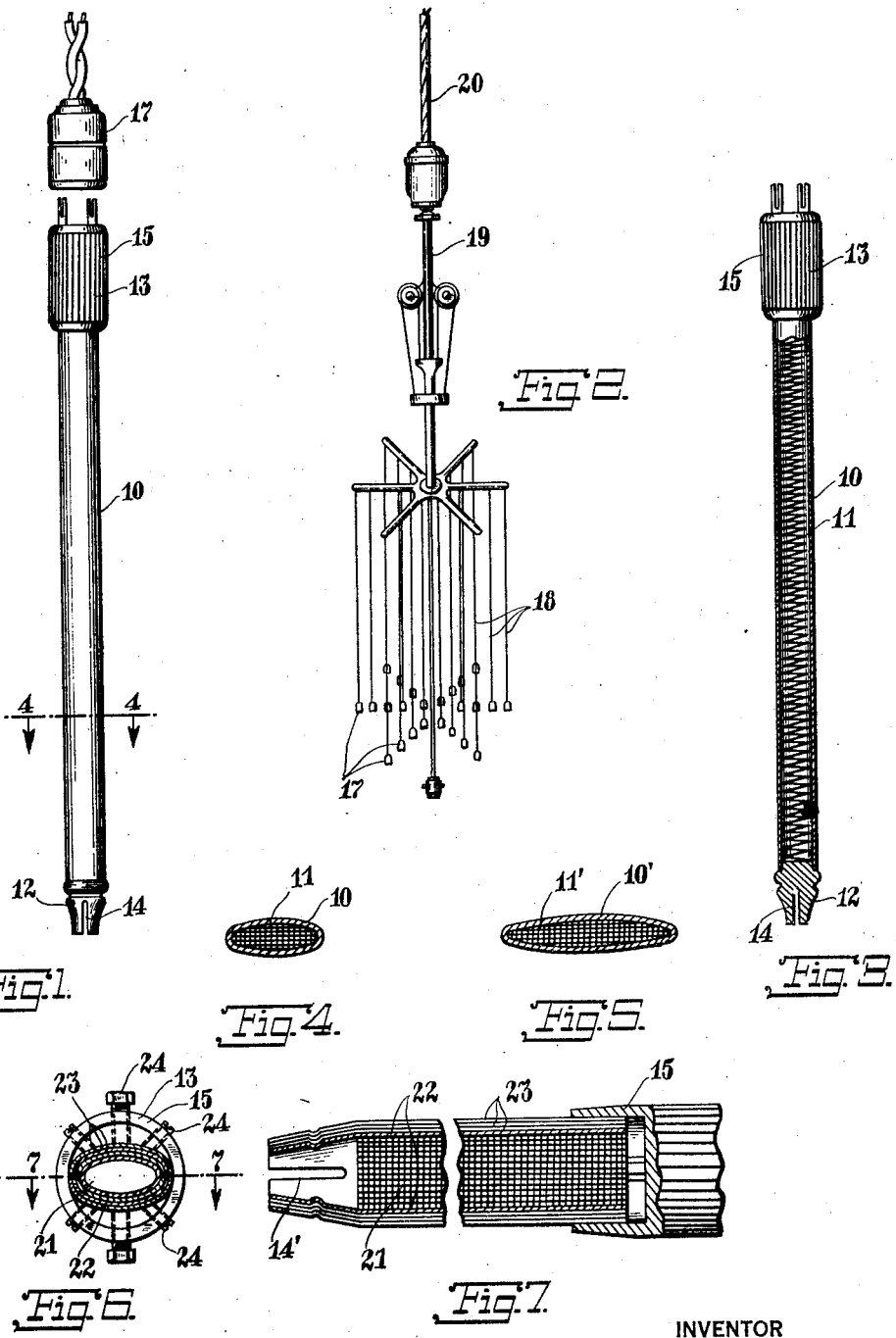

1,707,561

UNITED STATES PATENT OFFICE.

LEOPOLDO MEDIAVILLA, OF NEW YORK, N. Y.

ELECTRICAL PERMANENT-WAVING DEVICE.

Application filed February 25, 1928. Serial No. 256,838.

This invention relates generally to hair curlers for human hair, and has more particular reference to a novel hair curler capable of producing permanent waves.

The invention has for an object the provision of a device of the class mentioned, which is of simple durable construction, desirable and efficient in action, and which can be manufactured and sold at a reasonable cost.

The heater elements of the device are of oval shape which makes the waves tight on the small ends and soft on the large sides, thus eliminating the customary setting step after the heat treatment, which of course saves time. Heating windings are arranged within the heater elements so that the hair is heated from the inside when applied to the heating elements, giving it an opportunity to allow steam to work through every single hair. These heating windings extend the full length of the heating elements so that the same amount of heat exists at the center and ends of the heater elements. The size of the oval shape of the heater elements determine the size of the waves produced. These heater elements may be provided with means for varying the operative size of these oval shapes.

For further comprehension of the invention, and of the objects and advantages thereof, reference will be had to the following description and accompanying drawings, and to the appended claims in which the various novel features of the invention are more particularly set forth.

Referring to the accompanying drawings, forming a material part of this disclosure:—

Fig. 1 is a side elevational view of a heater element constructed according to this invention.

Fig. 2 is a perspective view of a device for holding the heater elements.

Fig. 3 is a view similar to Fig. 1, but a front portion thereof is broken away, disclosing the interior construction.

Fig. 4 is a horizontal sectional view, taken on the line 4—4 of Fig. 1.

Fig. 5 is a similar view, but disclosing a modified form thereof.

Fig. 6 is a sectional view of a modified form of heater element, taken as though looking in the opposite direction of the arrows 4—4 of Fig. 1.

Fig. 7 is a fragmentary sectional view, taken on the line 7—7 of Fig. 6.

The reference numeral 10 indicates generally a tubular body member of oval cross section, having a heating winding 11 extending from one end thereof completely to the other end, a steady head 12 is engaged in one end of the tubular body member, and a plug connection 13 is secured on the other end and connected with the winding 11, and this structure constitutes the heating element of the device. The head 12 is formed with a cut 14 to accommodate hair which may be tied in place by a string. The plug 13 has a long body 15 of insulation material, which can be used as a handle when the heater element is hot.

These heater elements are used in conjunction with a device for supporting them, and consisting of a plurality of complementary plugs 17 connected with cables 18 supported on bracket 19 provided with a main cable 20 for connection with some source of electrical power.

Fig. 5 illustrates a tubular member 10' and a winding 11' of greater size than the member 10 and winding 11. The size of the tubular member determines the size of the waves produced thereby.

Figs. 6 and 7 illustrate a heating element which may be varied in size, that is, with respect to the size of the oval shaped member. This heating element consists of a central heating winding 21 with an oval shaped tubular member 22. A plurality of curved members 23 are engaged on top and bottom of the member 22, so that a large size oval shaped heating element is produced. A plurality of screws 24 threadedly engage the body 15 of the plug, and abut against the outer curved members clamping all the tubular members in place. The fronts of these tubular members are provided with cuts 14' so that hair may be securely held. Should a smaller size heating element be needed, the screws 24 are loosened, and the outer curved members removed, then the screws are reset.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what

I claim as new and desire to secure by United States Letters Patent is:—

1. A heating curler element for the purpose described, comprising a tubular body member of oval cross section, heating means therein, a plurality of curved members engaged on the top and bottom of said tubular body member, and means for removably holding the curved members in place.

2. A heating curler element for the purpose described, comprising a tubular body member of oval cross section, heating means therein, a plurality of curved members engaged on the top and bottom of said tubular body member, and means for removably holding the curved members in place, comprising screws engaged in the heating curler and abutting against the outer curved member clamping all the curved members in place.

3. A heating curler element for the purpose described, comprising a tubular body member of oval cross section, heating means therein, a plurality of curved members engaged on the top and bottom of said tubular body member arranged for removably maintaining their places.

4. A heater element for a device of the class described, comprising an oval body member with opposite sharp curved sides on the major axis of the oval shape, and with substantially flat sides on the minor axis of the oval shape for forming a tight wave on the portion of a strand of hair applied on the sharp sides and a soft loose wave on the portion of a strand of hair applied on the substantially flat sides.

In testimony whereof I have affixed my signature.

LEOPOLDO MEDIAVILLA.